Figure 1:
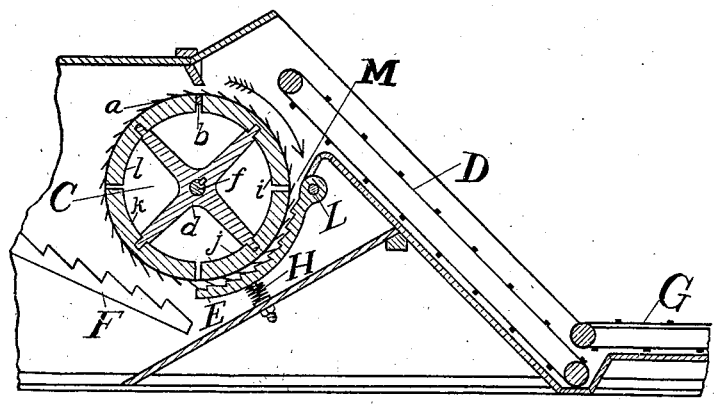

No. 724,855. PATENTED APR. 7, 1903.
A. HAERTLEIN.
HARVESTER THRESHING MACHINE.
APPLICATION FILED DEC. 10, 1901.
NO MODEL. 2 SHEETS—SHEET 1.

Witnesses.
Gustaf William Hanson
Frederick Weihermiller

Inventor.
Albrecht Haertlein
per John F. Hanson
Attorney.

No. 724,855. PATENTED APR. 7, 1903.
A. HAERTLEIN.
HARVESTER THRESHING MACHINE.
APPLICATION FILED DEC. 10, 1901.
NO MODEL. 2 SHEETS—SHEET 2.
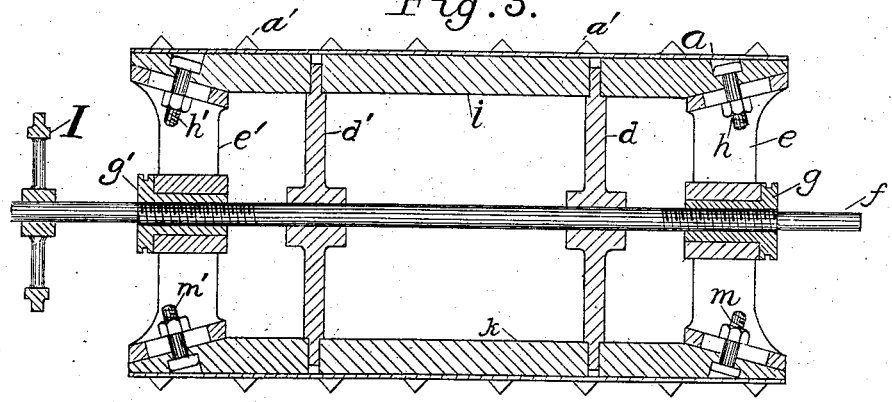
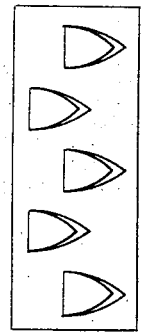
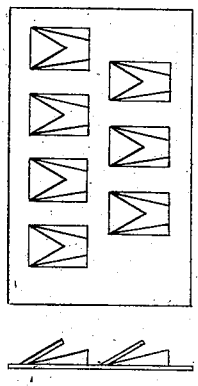
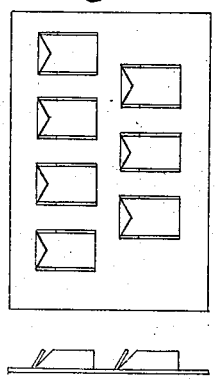
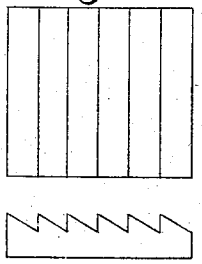
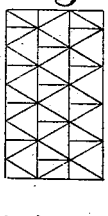
Witnesses.
Gustaf William Hanson
Frederick Neihermiller
Inventor.
Albrecht Haertlein.
per John F. Hanson
Attorney.

UNITED STATES PATENT OFFICE.

ALBRECHT HAERTLEIN, OF MARQUETTE, KANSAS.

HARVESTER THRESHING-MACHINE.

SPECIFICATION forming part of Letters Patent No. 724,855, dated April 7, 1903.

Application filed December 10, 1901. Serial No. 85,396. (No model.)

*To all whom it may concern:*

Be it known that I, ALBRECHT HAERTLEIN, a citizen of the United States, residing at Marquette, in the county of McPherson and State of Kansas, have invented a certain new and useful Improvement in Harvester Threshing-Machines; and I do hereby declare that the following is a full, clear, and exact description of the same.
This invention relates to new and useful improvements in harvester threshing-machines, the object of which is to separate the grain from the unthreshed head by friction of the rough surface of a cylindric drum against a concentric concave, which also has a suitable rough surface, thereby accomplishing by a slow speed of the cylindric drum the same amount of work as the cylinder of the present threshing-machines do, revolving at a high speed and separating the grain from the unthreshed head by striking it with sufficient force to jar the kernel loose from the head, then by reducing the speed greatly decreasing the amount of horse-power necessary to operate a harvester-thresher.

This invention consists of a cylindric drum with a removable shell made of sheet metal perforated, so as to raise parts of the said shell above the main surface of said shell, so as to produce a rough surface, and a concentric concave with a similar rough surface. Said concave may be composed of either chilled cast-iron or a frame covered with similar sheet metal as the drum, said concave having two springs that can be set to hold the concave with proper or sufficient pressure against the drum, which when revolving will cause a friction or grinding between the two surfaces, producing the desired effect of cutting or rubbing apart the unthreshed heads, so all the kernels will be separated from the head.

This device is to be placed on a header or other kinds of harvesters, so that the elevator elevating the grain harvested by the machine will drop the unthreshed grain in place in a manner that it will feed itself between the cylindric drum and concentric concave. There the kernels will be rubbed out of the heads, after which the straw and grain is carried forward and the grain separated from the straw by any separating devices of threshing-machines.

This device may be placed on wheels by itself with the necessary parts to complete the thresher and run close to the harvester, so as to have the harvested grain feed itself between the cylinder-drum and concentric concave.

My invention is clearly illustrated in the accompanying drawings, which, with the letters of reference marked thereon, form part of this application, and in which drawings similar letters of reference indicate like parts throughout the several views, in which—

Figure 2:
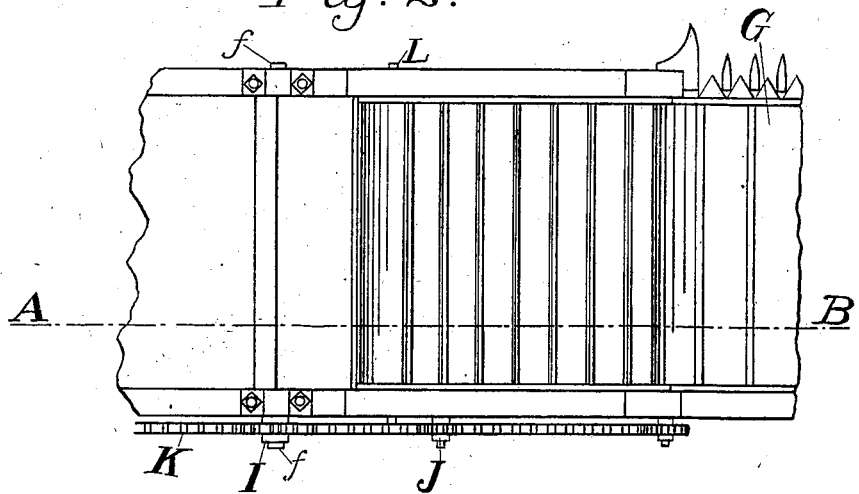

Figure 1 is a vertical sectional view at A B in Fig. 2, showing the arrangement of the cylindric drum and concave and their position in regard to the elevator of the harvester and the direction of revolution of said cylindric drum. Fig. 2 is a plan view showing how said cylindric drum is driven from the main distributing sprocket-chain when such is used. Fig. 3 is a sectional view of the said cylindric drum, showing its different parts and the device by which the said perforated metal can be removed and replaced at will. Figs. 4, 5, and 6 are plan and elevation views of three of the different kinds of perforations to be made in sheet metal to suit the different kinds of grain and can be used either on the drum or concave. Figs. 7 and 8 are plan elevation views of two of the different kinds of rough surfaces to be cast on the chilled cast-iron concaves or other material out of which it is made. Fig. 9 is an enlarged broken detail or partial section of cylinder and sheet-metal shell.

Reference now being had to the details of the drawings by letter, A B designate where the section is made in Fig. 2, of which Fig. 1 is the vertical sectional view. In harvesting grain is taken from the sickle-bar canvas G by the elevator-canvas D and deposited so as to fall at M, the junction of the cylindric drum C and the upper edge of the concave E, passing around and between part of the cylindric drum C and the concave E and then deposited on the first shaker F of the separating devices. The concave E is pivoted at one edge on the rod L and has on the other edge a spring H, which can be tightened, so as to give the concave E sufficient pressure against the cylindric drum C. The cylindric drum C is driven by the main distributing sprocket-chain and sprocket I so as to revolve in the direction indicated by the arrow J, being an idler-sprocket to give the sprocket-chain K the right direction around the sprocket I, which is attached to the shaft $f$, to which the cylindric drum C is fastened and by which it is driven. The cylindric drum C itself is composed of the shaft $f$, to which are keyed spiders $d$ and $d'$, both alike and having spokes that fit in drilled holes in the four segmental cylindric parts $i\ j\ k\ l$ of the cylinder, around which is a perforated sheet-metal shell $a$, which is bent to fit the cylinder, and where the lap is made is riveted a rib $b$, which fits into one of the divisions between the segmental parts $l$ and $i$, the segmental cylindrical parts $i, j, k,$ and $l$ each having beveled inner faces near the ends. These beveled inner faces rest on and are expanded outward against the perforated sheet-metal shell $a$ by two truncated cones $e$ and $e'$, both alike and fitting at their hubs around their respective bushings, which are in turn threaded around the shaft $f$, so that when the bushings are turned inward with a wrench they move the truncated cones $e$ and $e''$ inward against the turned conical or beveled surfaces on the ends of the segmental cylindrical parts, thus expanding the segmental cylindrical parts $i, j, k,$ and $l$ outward against the perforated sheet-metal shell $a$. The cylinder segments or staves when adjusted are held rigid in position by the bolts $h$ and $m$ clamping the truncated cone $e$ against and rigid to one end of the segmental cylindrical parts $i, j, k,$ and $l$, while the truncated cone $e'$ is clamped in a similar way with bolts $h'$ and $m'$. This construction of the cylindric drum $c$ is made so as to make it an easy matter to replace the shell $a$ when it becomes worn or easy to change for the different kinds of grain and care being taken so that the raised parts of the perforations point in the opposite direction of the revolution of the drum.

Having thus described my invention, what I claim to be new, and desire to secure by Letters Patent, is—

1. In a thresher-cylinder of the character described, the combination of a cylindrical sheet-metal shell having roughened outer surface, segments inclosed within said shell, and means for expanding said segments against the sheet-metal shell.

2. In a thresher-cylinder, the combination of a cylindrical sheet-metal shell having roughened outer surface, segments or staves within said shell, a supporting-shaft, and conic frustums adjustable on the shaft to bear against and expand said segments against the shell.

3. In a thresher-cylinder, the combination of the supporting-shaft having screw-threads thereon, threaded sleeves engaging therewith, conic frustums carried by said sleeves, segments or staves resting on said frustums, and a shell inclosing said segments, which segments are expansible against the shell by the adjustment of said frustums lengthwise of the shaft.

4. In a thresher-cylinder, the shaft having conic frustums near each end and adjustable lengthwise of the shaft, the staves or segments resting on said frustums, spiders keyed to the shaft and having spokes entering holes in the segments, and a sheet-metal shell surrounding said segments, all combined.

5. In a thresher-cylinder, a hollow cylindrical sheet-metal shell having roughened outer surface and an interior longitudinal rib, a series of internal staves or segments between two of which segments said rib is inclosed, and means for expanding said staves or segments against the shell, all combined.

6. In a thresher-cylinder, the combination of the outer shell, central shaft, frusto-conical end pieces and segments within the shell resting on the conical faces of said end pieces and bolts connecting the segments adjustably to the frusto-conical end pieces.

ALBRECHT HAERTLEIN.

Witnesses:
GUSTAF WILLIAM HANSON,
FREDERICK WEIHERMILLER.